Patented May 26, 1931

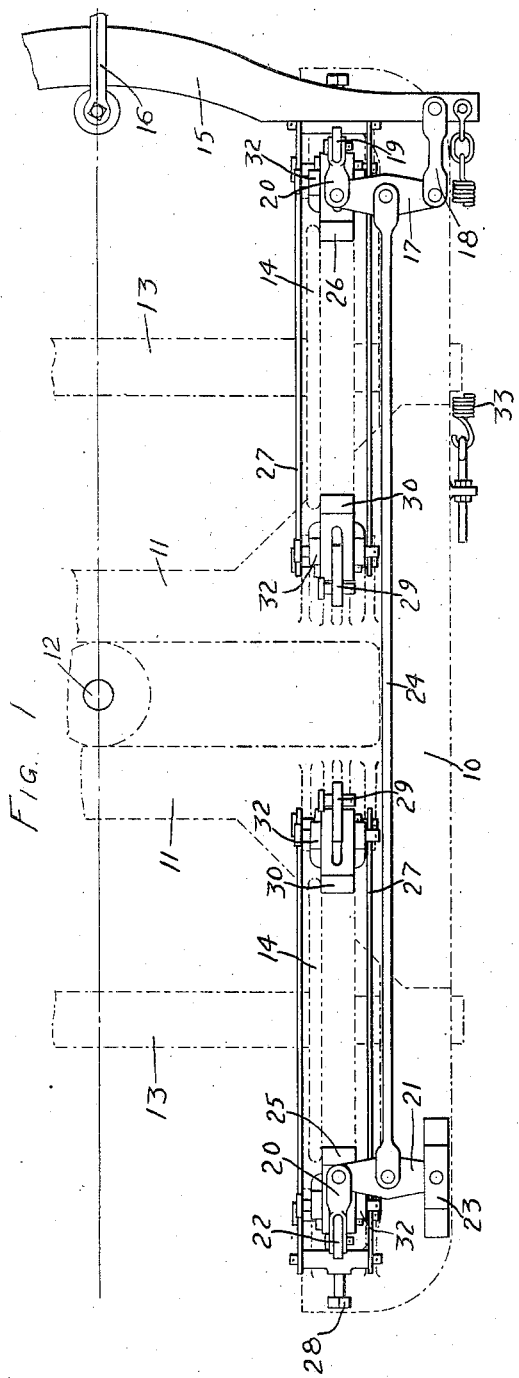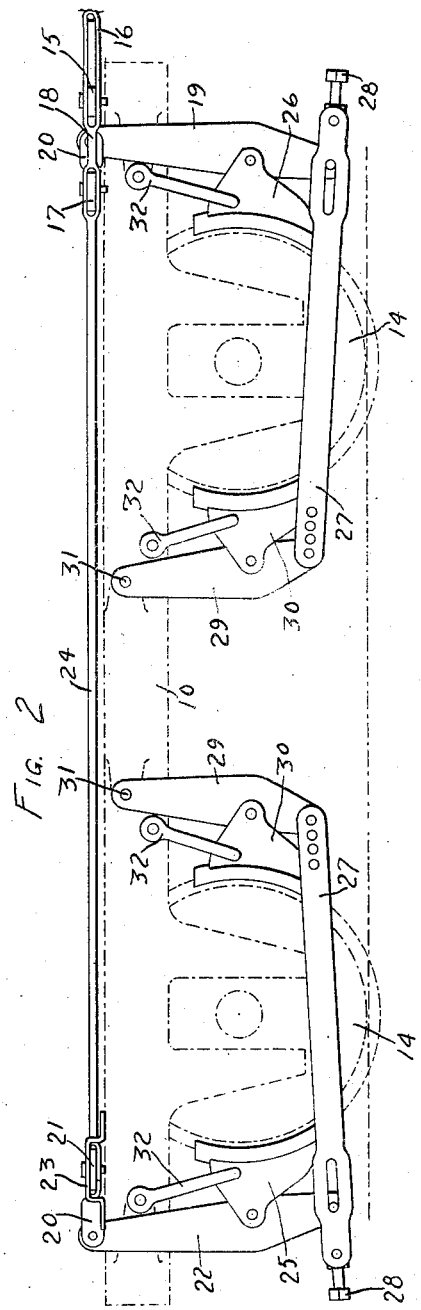

1,807,575

UNITED STATES PATENT OFFICE

WILLIAM H. MUSSEY, OF CHICAGO, ILLINOIS, ASSIGNOR TO PULLMAN CAR AND MANUFACTURING CORPORATION, OF CHICAGO, ILLINOIS, A CORPORATION OF ILLINOIS

CLASP BRAKE RIGGING

Application filed May 9, 1929. Serial No. 361,667.

The invention relates to clasp brake rigging for pivotal car trucks having two spaced pairs of wheels in which the brake shoe pressure is applied equably to opposite sides of each wheel, and is especially adapted for use on trucks in which the space between the wheels of each pair is occupied by motors or generator equipment carried upon one or more of the axles.

The principal object of the invention is to provide a clasp brake rigging in which the equalizing and brake levers are so disposed that the space between each pair of wheels above the axles will be clear of all rigging parts.

A further and important object is to so dispose and proportion all brake and equalizing levers and connections that the dead levers of the series will be positioned between adjacent pairs of wheels and the moving or live levers on the outside of said wheels whereby the wheel base of the truck may be shortened and the stresses in the radius bar and immediate connections minimized and the weight of these parts correspondingly reduced.

A still further object is to dispense with the use of brake beams and to further simplify the brake arrangement.

The foregoing and other objects are attained by the mechanism illustrated in the following drawings, in which Fig. 1 is a plan view of a pivotal truck equipped with a clasp brake rigging in accordance with the invention, the truck frame, wheels, and axes being shown in dotted lines.

Fig. 2 is a side elevational view of the rigging showing the relative positions of the live and dead levers in the series of brake levers.

Heretofore it has been the practice to arrange the dead levers of clasp brake rigging for motor trucks at the ends of the truck frame and the live levers between the wheels, thereby necessitating the use of intermediate equalizing levers adjacent the transverse center line of the truck for direct connection to the live levers. Because of such connection the upper ends of the live levers were required to protrude above the truck frame at the transoms and to have sufficient movement to permit full brake shoe application. To avoid possible interference between such levers and the transoms and/or bolster swing hangers, the wheel base of the truck was proportioned to provide the necessary clearance and the length of the truck frame and live levers increased to effectuate that purpose. As herein first above outlined the present invention is designed to overcome these objections by hanging the relatively quiescent dead levers adjacent the transverse center line of the truck and positioning the comparatively active live levers and equalizing bars at the ends of the truck frame normally free from operating paraphernalia and affording ample room for all of the movable brake parts.

In the drawings, 10 represents the car truck frame, 11 the transoms, 12 the center plate, 13 the axles, and 14 the wheels. Upon one end of the truck frame is mounted the usual radius equalizing bar 15 actuated by a pull rod 16 leading to a source of power on the car and slidably supported on the truck frame. Since the brake elements on opposite sides of the longitudinal center of the truck are identical but one-half of the truck is indicated in plan. The radius bar is connected at its ends to adjacent ends of equalizing bars 17 by short links 18, the bars 17 being connected at their opposite ends to the upper ends of respective live levers 19 by other links 20 as best shown in Fig. 1.

Similar levers 21 are in like fashion also connected to adjacent upper ends of live levers 22 at the opposite end of the truck frame and anchored at their opposite ends to fulcrum brackets 23 secured to the truck frame, levers 17 and 21 being connected at their intermediate portions by pull rods 24. The live levers 22 and 19 are fulcrumed intermediate their ends to respectively adjacent outer brake shoes 25 and 26 and at their lower ends to tension yokes 27 having lever fulcrum adjusting mechanism 28 at their outer ends.

At their respective inner ends the yokes are secured to the lower ends of dead levers 29 positioned between adjacent pairs of wheels. The dead levers are fulcrumed intermediate their ends to inner shoes 30 and anchored at their upper ends to brackets 31 on the truck frame. The brake shoes are operatively supported upon opposite sides of each wheel by brake hangers 32 pivotally secured to the truck frame. Suitable release springs 33 may be provided and connected at their ends to the truck frame 10 and radius bar 15 respectively as shown in Fig. 1.

It will be noted that there has been provided a clasp brake rigging for motor trucks whereby all of the space between the wheels of each pair and above the axles has been left free for the installation of motors or generators without interference from brake connections or brake beams.

What I claim is:—

1. A clasp brake rigging for pivotal car trucks comprising a truck frame and a plurality of pairs of wheels, dead brake levers fulcrumed on shoes applied to the inner sides of adjacent pairs of wheels, live brake levers fulcrumed on shoes applied to the other side of said wheels, tie bars connecting the lower ends of the levers of each pair, equalizing levers extending inwardly from the truck sides for connection to the upper ends of adjacent live levers, an equalizing radius bar connected to the opposite ends of certain of said equalizing levers, and a pull rod connecting said equalizing bars intermediate their ends.

2. A clasp brake rigging for pivotal car trucks having a truck frame and a plurality of pairs of wheels, dead brake levers fulcrumed on shoes applied to the inner sides of adjacent pairs of wheels, live brake levers fulcrumed on shoes applied to the other side of said wheels, tie bars connecting the lower ends of the levers of each pair, equalizing levers adjacent opposite ends of said truck frame and extending inwardly for connection to the upper ends of adjacent live levers, certain of said equalizing levers being fulcrumed at their opposite ends upon the truck frame, an equalizing radius bar connected at its ends to adjacent ends of the other of said equalizing bars, and a pull rod connecting said equalizing bars intermediate their ends.

3. In a clasp brake rigging for pivotal car trucks having a truck frame including a plurality of pairs of wheels, outer and inner brake shoes on opposite sides of each wheel, live and dead levers fulcrumed intermediate their ends upon said shoes respectively, inwardly directed equalizing levers at opposite ends of the truck frame having their inner ends connected to the upper ends of respectively adjacent live levers with certain of their outer ends anchored to the truck frame, a radius bar connecting the outer ends of adjacent equalizing levers, and pull rods connecting said equalizing levers intermediate their ends.

In witness whereof I have hereto set my hand this 29th day of April, 1929.

WILLIAM H. MUSSEY.